United States Patent [19]

Kamada et al.

[11] Patent Number: 5,399,131
[45] Date of Patent: Mar. 21, 1995

[54] AUTOMATIC TRANSMISSION CONTROL SYSTEM HAVING TWO ACCUMULATORS FOR FOUR CLUTCHES CONTROLLED BY A SINGLE ACCUMULATOR BACK PRESSURE VALVE

[75] Inventors: Shinya Kamada; Takayuki Sumimoto, both of Hiroshima; Minoru Kuriyama, Higashihiroshima; Kyosuke Mori, Kitakyushu, all of Japan

[73] Assignee: Mazda Motor Corporation, Hiroshima, Japan

[21] Appl. No.: 11,487

[22] Filed: Jan. 28, 1993

[30] Foreign Application Priority Data

Jan. 31, 1992 [JP] Japan .................................. 4-046286

[51] Int. Cl.⁶ ............................................. F16H 61/04
[52] U.S. Cl. .................................... 477/150; 477/164; 477/152
[58] Field of Search .................. 74/868, 869, 867; 477/143, 150, 152, 164

[56] References Cited

U.S. PATENT DOCUMENTS

| 4,722,250 | 2/1988 | Sumiya et al. ............... 74/868 X |
| 4,838,126 | 6/1989 | Wilfinger et al. .................. 74/869 |
| 5,012,699 | 5/1991 | Aoki et al. ............................... 74/869 |
| 5,020,393 | 6/1991 | Kuwayama et al. ............. 74/868 X |
| 5,078,028 | 1/1992 | Ishikawa et al. ....................... 74/868 |

FOREIGN PATENT DOCUMENTS 1-150055  6/1989  Japan .

Primary Examiner—Dirk Wright
Assistant Examiner—Khoi Q. Ta
Attorney, Agent, or Firm—Keck, Mahin & Cate

[57] ABSTRACT

An automatic transmission control system includes a hydraulic circuit for controlling coupling pressure supplied to frictional coupling elements of the automatic transmission, which are selectively coupled and uncoupled so as to shift the automatic transmission into desired gears. The hydraulic circuit has a solenoid valve, for regulating a principal hydraulic pressure to provide a control pressure in accordance with vehicle driving conditions. The coupling pressure, supplied to a frictional coupling element, is regulated by a regulating valve in accordance with a control pressure level, and during shifting of the automatic transmission, is supplied through an accumulator whose back pressure is controlled in accordance with the control pressure by a control valve.

6 Claims, 4 Drawing Sheets

AUTOMATIC TRANSMISSION CONTROL SYSTEM HAVING TWO ACCUMULATORS FOR FOUR CLUTCHES CONTROLLED BY A SINGLE ACCUMULATOR BACK PRESSURE VALVE

BACKGROUND OF THE INVENTION

1. Field of the Invention

This invention is related to an automatic transmission control system for automobiles and, in particular, to a control system for controlling the supply of coupling pressure on frictional coupling elements of an automatic transmission through a hydraulic pressure circuit.

2. Description of Related Art

In automatic transmissions for automobiles, a transmission gear mechanism is coupled to a torque converter, and a drive torque transmission path of the transmission gear mechanism is changeable through the selective coupling of a plurality of frictional coupling elements so as to automatically shift the automatic transmission to various gears according to vehicle driving conditions. In such an automatic transmission, a hydraulic controlling circuit controls coupling pressure supplied to the frictional coupling elements. Japanese Unexamined Patent Publication No. 1-150055 discloses a hydraulic control circuit of this type, which has a linear solenoid valve to control coupling pressure supplied to each of the frictional coupling elements. This hydraulic control circuit includes a regulating valve disposed in a pressure line to the frictional coupling elements. The control pressure supplied to the regulating valve is developed by means of the linear solenoid valve. In this instance, a control signal is output to the linear solenoid valve from a controller so as to develop the control pressure supplied to the regulating valve, thereby appropriately controlling the coupling pressure applied to the frictional coupling elements. For example, through the adjustment of torque transmission capacity of the frictional coupling element relative to an input torque to the frictional coupling element, the frictional coupling element reliably transmits torque without loss in driving force of an oil pump attributable to an unnecessary increase in torque transmission capacity.

In addition, with this type of hydraulic control circuit, when supplying coupling pressure to the frictional coupling element during gear shifting, in order to prevent the transmission from causing "shift shock" due to an abrupt coupling of the frictional coupling element or elements, the coupling pressure is gradually increased. Hence, an accumulator is necessarily provided in a hydraulic pressure line to the frictional coupling elements.

The accumulator functions to delay the rising or implementation of the coupling pressure supplied to the frictional coupling elements through the hydraulic pressure lines by causing the movement of a piston of the accumulator against a back pressure within the hydraulic pressure line. However, properly controlling the rising or implementation of coupling pressure causes the necessity of controlling the back pressure continuously acting on the piston. For this control, a linear solenoid valve or a duty solenoid valve is necessarily installed in the hydraulic pressure line. Accordingly, as described in the above mentioned publication, where a solenoid valve is provided to regulate the coupling pressure itself along with the regulating valve, then another solenoid valve is required to control the back pressure of the accumulator. This results in an increase in the number of solenoid valves that must be provided in the hydraulic control circuit. In addition, the control pressure generating solenoid valve is not required to have a high flow rate of output but essentially regulates the pressure supplied to the regulating valve with a high accuracy. On the other hand, since the back pressure control solenoid valve must provide the back pressure of the accumulator prior to introducing the coupling pressure to the accumulator, it is required to have a high flow rate of output. These conflicting requirements preclude use of a single solenoid valve for providing the functions of both control pressure generating solenoid valve and back pressure control solenoid valve. Consequently, the control valve units included as part of the hydraulic control circuit must be large in size, with a significant increase in weight and cost.

SUMMARY OF THE INVENTION

It is therefore an object of the present invention to provide an automatic transmission control system including a hydraulic control circuit in which different pressure regulations, such as the regulation of coupling pressure for selectively coupling frictional coupling elements of an automatic transmission and the regulation of back pressure of accumulators for controlling the supply of coupling pressure to the frictional coupling elements, are realized by a single solenoid valve means.

It is another object of the present invention to provide an automatic transmission control system which has a simplified hydraulic control circuit and is miniaturized in size with an accompanying decrease in weight and cost.

The forgoing objects of the present invention are achieved by providing an automatic transmission control system including an hydraulic control circuit for controlling coupling pressure supplied to a plurality of frictional coupling elements of the automatic transmission, which are selectively coupled and uncoupled so as to shift the automatic transmission into desired gears. The hydraulic control circuit includes a pressure regulating means, such as a linear solenoid valve, for regulating a principal hydraulic pressure to provide a control pressure in accordance with vehicle driving conditions. The coupling pressure, supplied to each frictional coupling element, is regulated by a regulating valve in accordance with a level of the control pressure, and during shifting of the automatic transmission, is supplied through an accumulator whose back pressure is controlled in accordance with the control pressure by a control valve.

The regulating valve and the accumulator operate at different timings. The pressure regulating means provides control pressure to the regulating valves and the accumulator correspondingly at the different timings.

The regulating valves and the accumulators, which function differently, can be controlled appropriately, even in multiple numbers, by a single solenoid valve means.

According to this invention, the control pressure generated by the solenoid valve is supplied to the pressure regulating valve for regulating coupling pressure which in turn is supplied to the frictional coupling elements. At the same time, the control pressure is also supplied to a control valve that regulates back pressure of the accumulator. Since the differing operations, i.e.

the regulation of coupling pressure and the control of the back pressure, can be accomplished by means of a single solenoid valve, the hydraulic control circuit is simplified. Accordingly, the control valve is enabled to regulate or adjust the coupling pressure with a high accuracy, while a sufficient quantity of the working oil is guaranteed for providing a back pressure of the accumulator. In addition, regarding the accumulator which requires a large quantity of oil flow, the control pressure is supplied to the back pressure control valve so as to guarantee a required back pressure. In this manner, the differing types of controls can be desirably accomplished by a single solenoid valve.

In addition, timings at which the regulating valve and the accumulator operate are different. Hence, when generating the control pressures, the solenoid valve establishes the most appropriate pressure corresponding to the respective demands of these components. Accordingly, the regulation of the control pressure by the regulating valve and the control of the supply of the coupling pressure take place more appropriately.

BRIEF DESCRIPTION OF THE DRAWINGS

The above and other objects and features of the present invention will be clearly understood from the following detailed description with respect to preferred embodiments thereof when considered in conjunction with the accompanying drawings, in which.

DETAILED DESCRIPTION OF THE PREFERRED EMBODIMENT

Because automatic transmissions are well known, the present description will be directed in particular to elements forming part of, or cooperating directly with, an apparatus in accordance with the present invention. It is to be understood that parts or elements which are purely of conventional constructions will not be described in detail and may not be illustrated. Such parts or elements not specifically shown or described can take various forms well known to those skilled in the automobile art.

Figure 1:
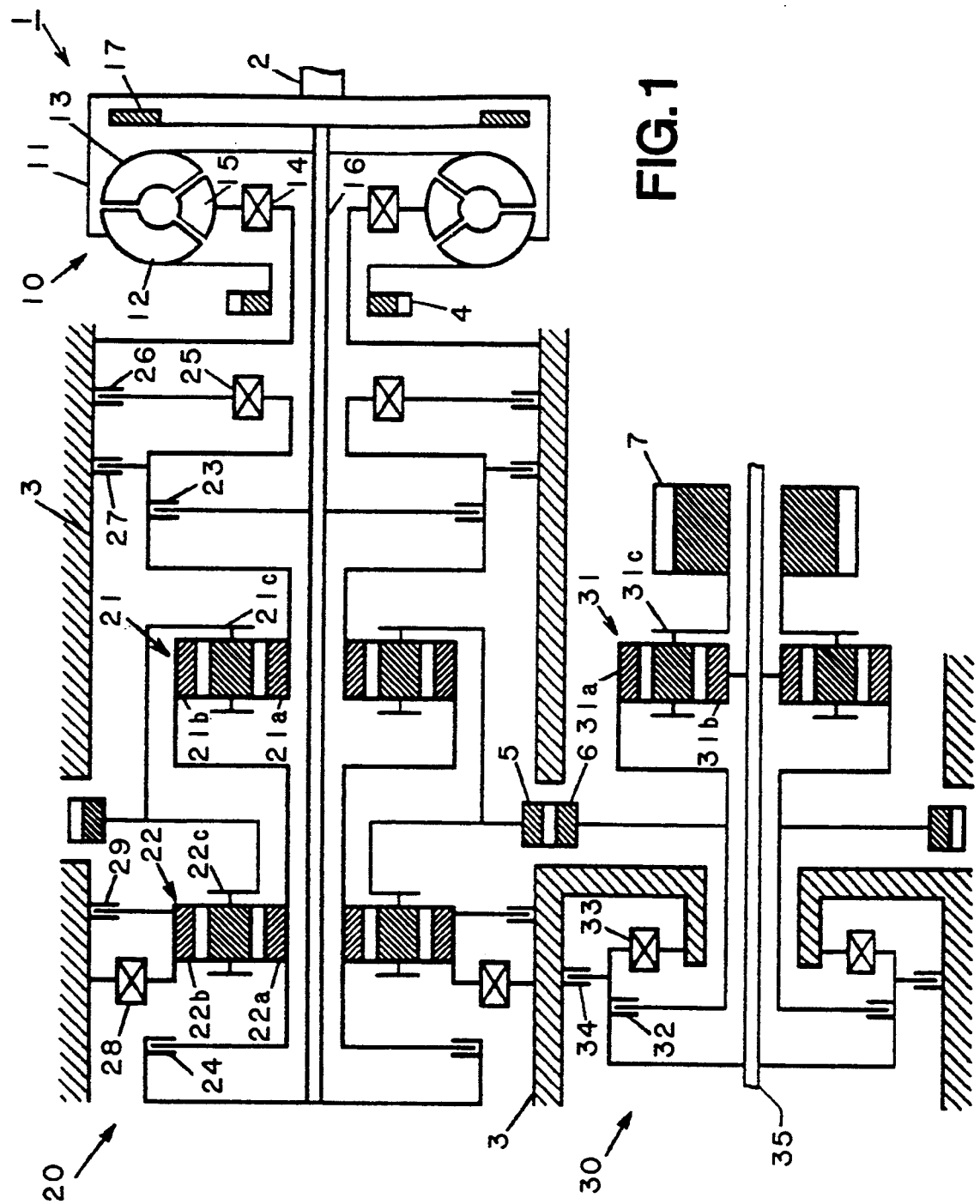
FIG. 1 is a schematic diagram of an automatic transmission cooperating with a control system in accordance with a preferred embodiment of the present invention.

Referring to the drawings in detail, and in particular, to FIG. 1, an automatic transmission 1 of an automobile, which is controlled by a control system in accordance with a preferred embodiment of the present invention and which forms part of the power train, is shown as being equipped with a torque converter 10. The automatic transmission 1 includes a primary transmission 20 arranged coaxially with the torque converter 10, and a secondary transmission 30 arranged in parallel with the primary transmission.

The torque converter 10 is composed of a pump 12, a turbine 13, a stator 15 and a lock-up clutch 17. The pump 12 is structurally integral with a case 11 which is coupled to an engine output shaft 2, such as a crankshaft. The turbine 13, positioned facing to the pump 12 and having an output shaft or turbine shaft 16, is driven by viscous oil forced by the pump 12. The stator 15, functioning as a torque amplifier, is positioned between the pump 12 and the turbine 13 and is supported by a transmission case 3 through a one-way clutch (OWC) 14. The lock-up clutch 17 directly couples the output shaft 16 to the engine output shaft 2 through the case 11. Between the torque converter 10 and the primary transmission 20, there is provided an oil pump 4 driven by the engine output shaft 2 through the case 11.

The primary transmission 20 has a front planetary gear mechanism 21 mounted on the output shaft 16 adjacent to the torque converter 10, and a rear planetary gear mechanism 22 mounted coaxially with the front planetary gear mechanism 21 on the output shaft 16 remote from the torque converter 10 with respect to the front planetary gear mechanism 21.

The output shaft 16 of the torque converter 10 is selectively coupled to a sun gear 21a of the front planetary gear mechanism 21 through a direct coupling clutch (DCC) 23, and to a sun gear 22a of the rear planetary gear mechanism 22 through a forward propulsion clutch (FPC) 24. A ring gear 21b of the front planetary gear mechanism 21 and a sun gear 22a of the rear planetary gear mechanism 22 are coupled with each other. Between the sun gear 21a of the front planetary gear mechanism 21 and the transmission case 3, there are provided a primary one-way clutch (1-OWC) 25 and an interim brake (IB) 26 arranged in series relative to each other. In addition, there is provided a coasting brake (CB) 27 for engine braking arranged in parallel with the primary one-way clutch (1-OWC) 25 and the interim brake (IB) 26. Between a ring gear 22b of the rear planetary gear mechanism 22 and the transmission case 3, there is provided a secondary one-way clutch (2-OWC) 28 and a low reverse brake (LRB) 29 arranged in parallel relative to each other. Pinion carriers 21c and 22c of the front planetary gear mechanism 21 and the rear planetary gear mechanism 22, which are coupled to each other, are coupled by means of interim gears 5 and 6 through which drive force is transmitted from the primary transmission 20 to the secondary transmission 30.

By means of this construction of the automatic transmission 1, the primary transmission 20 offers three forward gears and a reverse gear. Specifically, when only the forward propulsion clutch (FPC) 24 is coupled, output torque from the torque converter 10 is transmitted to the sun gear 22a of the rear planetary gear mechanism 22 and, at the same time, the ring gear 22b is fixed to the transmission case 3 through the secondary one-way clutch (2-OWC) 28, so that the rotation of the output shaft 16 of the torque converter 10 is reduced at a great reduction ratio and transmitted or extended from the pinion carrier 22c of the planetary gear mechanism 22 to the interim gear 5, resulting in the shift to the first forward gear of the primary transmission 20. When the interim brake (IB) 26 is coupled while the first forward gear is completed, the sun gear 21a of the front planetary gear mechanism 21 is fixed by means of the primary one-way clutch (1-OWC) 25.

Consequently, output torque of the output shaft 16 of the torque converter 10, which is transmitted to the ring gear 21b of the front planetary gear mechanism 21 through the sun gear 22a of the rear planetary gear mechanism 22 and the forward propulsion clutch (FPC) 24, is reduced at a reduction ratio that is smaller than that of the reduction ratio for the first forward gear of the front planetary gear mechanism 21, and then, is output to the interim gear 5 through the pinion carrier 21c. This results in shifting the primary transmission 20 into a second forward gear.

When the direct coupling clutch (DCC) 23 is coupled while the second forward gear is completed, output torque of the torque converter 10 is transmitted to the ring gear 21b of the front planetary gear mechanism 21 through the forward propulsion clutch (FPC) 24 and the sun gear 22a of rear planetary gear mechanism 22 and simultaneously transmitted to the sun gear 21a of the front planetary gear mechanism 21 through the direct coupling clutch (DCC) 23. As a result, the front planetary gear mechanism 21 rotates as one integral unit, rotation of output shaft 16 the torque converter 10 is directly transmitted to the interim gear 5 through the pinion carrier 21c without speed reduction, resulting in shifting the primary transmission 20 into a third forward gear.

When the forward propulsion clutch (FPC) 24 is released, and the low reverse brake (LRB) 29 and the direct coupling clutch (DCC) 23 are coupled, rotation of the output shaft 16 of the torque converter 10 is, on one hand, transmitted to the sun gear 21a of the front planetary gear mechanism 21 and, on the other hand, reversed and transmitted to the interim gear 5 through the pinion carriers 21c and 22c of the planetary gear mechanisms 21 and 22. This is because the ring gear 22b of the rear planetary gear mechanism 22 becomes fixed by means of coupling the low reverse brake (LRB) 29 and the direct coupling clutch (DCC) 23. As a result, shifting to a reverse gear of the primary transmission 20 is completed.

On deceleration during the first forward gear and the second forward gear, the primary and secondary one-way clutches 25 and 28 rotate freely, and consequently, no engine brake applies. However, engine brake is available by means of the coupling of the low reverse brake (LRB) 29, which lies in parallel with the secondary one-way clutch (2-OWC) 28, at the first forward gear which falls in a range of engine brake application, and by means of the coupling of coasting brake (CB) 27, which lies in parallel with the primary one-way clutch (1-OWC) 25, at the second forward gear.

On the other hand, the secondary transmission 30 possesses a planetary gear mechanism 31, which is coupled to the primary transmission 20 at all times through the engagement of their interim gears 5 and 6. The planetary gear mechanism 31 of the secondary transmission 30 includes a ring gear 31a in mesh with the interim gear 6. Further, there are provided a direct coupling clutch (DCC) 32 between the ring gear 31a and a sun gear 31b of the planetary gear mechanism 31, and a third one-way clutch (3-OWC) 33 and a speed reduction brake (SRB) 34, arranged in parallel relative to each other, between the sun gear 31b and the transmission case 3. The planetary gear mechanism 31 via shaft 35 includes a pinion carrier 31c coupled to its output gear 7 through which its output is transmitted to left and right drive wheels (not shown) through a differential.

The secondary transmission 30 is structured so as to change rotational speeds, developed by the primary transmission 20 and transmitted thereto through the interim gears 5 and 6, to two forward speeds. Specifically, when the direct coupling clutch (DCC) 32 is released, and the speed reduction brake (SRB) 34 is coupled, the sun gear 31b of the planetary gear mechanism 31 becomes fixed, so that torque input from the interim gear 6 to the ring gear 31a of the planetary gear mechanism 31 is reduced and is transmitted to the output gear 7 from the pinion carrier 31c. In addition, when the direct coupling clutch (DCC) 32 becomes coupled and the speed reduction brake (SRB) 34 is released, then the ring gear 31a and sun gear 31b of the planetary gear mechanism 31 are coupled, so as to transmit output torque from the interim gear 6 directly to the output gear 7. In this manner, the primary transmission 20 provides three forward gears and one reverse gear, and the secondary transmission 30 provides two forward gears. Accordingly, the entire automatic transmission 1 theoretically provides six forward gears and two reverse gears. However, in this example, of these gears, five forward gears and one reverse gear may be adopted.

The operations of the respective clutches and brakes for five forward gears and one reverse gear are shown in Table I, wherein an element indicated by a circle in parentheses is coupled only for gears which are utilized for engine braking.

TABLE I

| | | Primary Transmission | | | | | | |
|---|---|---|---|---|---|---|---|---|
| Gear | | DCC(23) | FPC(24) | IB(26) | CB(27) | LRB(29) | 1-OWC | 2-OWC |
| 1st | 1st | | ○ | | | (○) | Free | Lock |
| 2nd | 1st | | ○ | | | (○) | Free | Lock |
| 3rd | 2nd | | ○ | ○ | (○) | | Lock | Free |
| 4th | 3rd | ○ | ○ | ○ | | | Free | Free |
| 5th | 3rd | ○ | ○ | ○ | | | Free | Free |
| Rev. | Rev. | ○ | | | | ○ | Free | Free |

Rev.: Reversal

| | Secondary Transmission | | |
|---|---|---|---|
| Gear | DCC(32) | SRB(34) | 3-OWC |
| 1st | Red. | | ○ | Lock |
| 2nd | D-Coup. | ○ | | Free |
| 3rd | Red. | | ○ | Lock |
| 4th | Red. | | ○ | Lock |
| 5th | D-Coup. | ○ | | Free |
| Rev. | Red. | | ○ | Free |

Red.: Speed Reduction, D-Coup.: Direct Coupling

Figure 2:
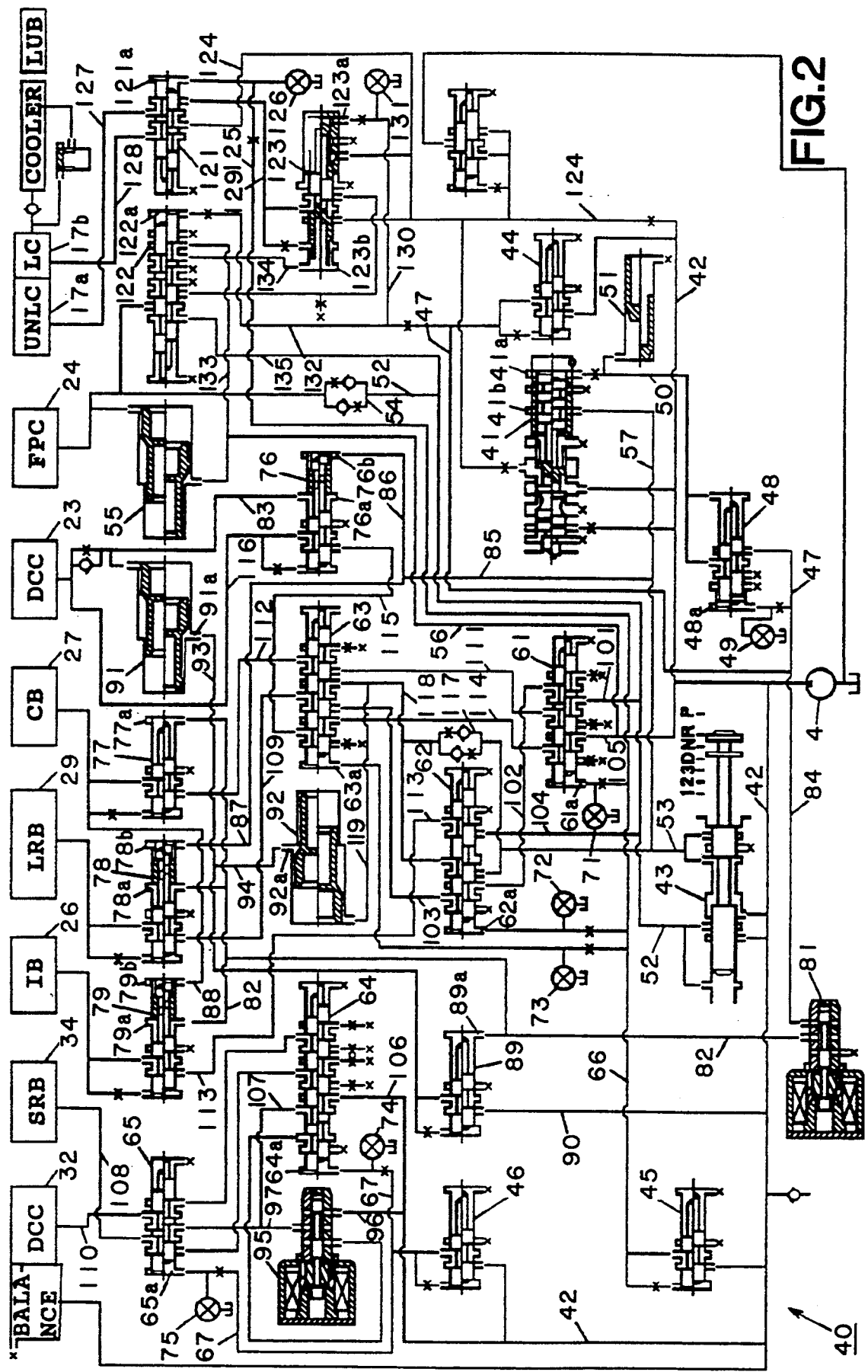
FIG. 2 is a schematic of the hydraulic control circuit of the control system.

Combinations of operation of the clutches and brakes shown in Table 1 for selectively providing desired gears with respect to driving conditions, or driver's demands are established by a hydraulic control circuit shown in FIG. 2.

Referring to FIG. 2, the hydraulic control circuit has a regulating valve 41 for regulating working pressure expelled from the oil pump 4 to a specified line pressure.

The line pressure, regulated by the regulating valve 41, is delivered through a main pressure line 42 to a manual valve 43 manually operated by the driver, and first to third reducing valves 44, 45 and 46 which generate various principal control pressures. A principal control pressure generated or reduced by one of the reducing valves 44-46, i.e. the first reducing valve 44, is delivered through a pressure line 47 to a modulator valve 48. The modulator valve 48, on the other hand, receives at its control port 48a a control pressure which is regulated by a duty solenoid valve 49. Accordingly, the modulator valve 48 develops a modulated pressure corresponding to a duty ratio of the duty solenoid valve 49, which is defined as a ratio of an actuation time relative to one cycle of actuation and deactuation of the duty solenoid valve 49. The modulated pressure is supplied to a primary pressure raising port 41a of the regulating valve 41 through a pressure line 50, so as to raise the line pressure corresponding to the duty ratio. In this instance, by setting the duty ratio of the duty solenoid valve 49 according to throttle openings, then the line pressure is adjusted to pressure levels corresponding to the engine throttle openings. In the pressure line 50, through which the modulated pressure is supplied to the primary pressure raising port 41a of the regulating valve 41, an accumulator 51 is disposed so as to control pulsations of pressure caused due to cyclic actuation of the duty solenoid valve 49.

The manual valve 43 is manually operated to selectively provide various ranges of the automatic transmission 1, such as a drive (D) range, a third (3rd) range, a second (2nd) range, a first (1st) range, a reverse (R) range, a neutral (N) range and a park (P) range. The main pressure line 42 is communicated with a forward pressure line 52 in the forward (D, 3rd, 2nd and 1st) ranges, and to a reverse pressure line 53 in the reverse (R) range. The forward pressure line 52 leads to the forward propulsion clutch 24 through an orifice 54 which constrains the amount of oil passing therethrough between being supplied and discharged. Consequently, in each of the forward (D, 3rd, 2nd and 1st) ranges, the forward propulsion clutch 24 is coupled all times. In this instance, to the forward pressure line 52 is attached a first accumulator 55 which mitigates shocks occurring when pressure is supplied to the forward propulsion clutch 24. To this accumulator 55 back pressure is supplied from the main pressure line 42 through a pressure line 56. In addition, a pressure line 57 branches off from the reverse pressure line 53 in communication with a second pressure raising port 41b of the regulating valve 41 in order to raise the regulated level of the line pressure in the reverse (R) range. From the main pressure line 42, the forward pressure line 52 and the reverse pressure line 53, line pressure is supplied to first to third shift valves 61, 62 and 63 for the primary transmission 20, and fourth and fifth shift valves 64 and 65 for the secondary transmission 30. These shift valves 61-65 are provided at their one ends with control ports 61a-65a, respectively. A principal control pressure line 66, leading from the second reducing valve 45, is connected to each of the respective control ports 61a-63a of the first to third shift valves 61-63 for the primary transmission 20. Similarly, another principal control pressure line 67 leading from the third reducing valve 46, is connected to each of the respective control ports 64a and 65a of the fourth and fifth shift valves 64 and 65 for the secondary transmission 30.

The principal control pressure lines 66 and 67 are provided with first to fifth ON-OFF solenoid valves 71-75 correspondingly to the first to fifth shift valves 61-65, respectively. These ON-OFF solenoid valves 71-75 are energized or turned ON so as to drain the control ports 61a-65a of the shift valves 61-65, respectively. Accordingly, a spool of each of the shift valves 61-65 responds to the corresponding on/off solenoid valves 71-75 such that it is positioned on the left side as viewed in FIG. 2 when the shift valve is energized or turned ON, and is positioned on the right side as viewed in FIG. 2 when the shift valve is deenergized or turned OFF.

Combinations of operations of the respective ON-OFF solenoid valves 71-75 are shown for various gears in Table II, wherein the forward gear in parentheses is used for letting engine braking be available and a star sign (*) means that the ON-OFF solenoid valve marked with the sign is deenergized or turned off after being energized or turned on.

TABLE II

| On-OFF Solenoid Valve | P | R | N | D, 3rd, 2nd, 1st | | | | | | |
|---|---|---|---|---|---|---|---|---|---|---|
| | | | | 1st | (1st) | 2nd | (2nd) | 3rd | 4th | 5th |
| 1st | OFF | OFF | OFF | ON | ON | ON | ON | OFF | OFF | OFF |
| 2nd | OFF | OFF | OFF | OFF | OFF | OFF | OFF | ON | ON | ON |
| 3rd | OFF | OFF | OFF | OFF | ON | OFF | ON | ON | OFF | OFF |
| 4th | OFF | OFF | OFF | OFF | OFF | OFF* | OFF* | OFF | OFF | OFF* |
| 5th | OFF | OFF | OFF | OFF | OFF | ON | ON | OFF | OFF | ON |

According to combinations of operation of the first to fifth ON-OFF solenoid valves 71-75 shown in FIG. 2, positions of the respective spools of the shift valves 61-65 are determined, according to which a pressure line is selectively communicated with the main pressure line 42, the forward pressure line 52 and the reverse pressure line 53 so as to provide selectively the combinations of coupling of the various clutches and brakes as shown in Table I for thereby shifting the automatic transmission 1 to any desired gear, such as the first to fifth forward gears and the reverse gear.

In this instance, the hydraulic control circuit has regulating valves 76-79 for regulating and reducing the line pressure to specified coupling pressure to the direct coupling clutch 23, the coast brake 27, the low reverse brake 29 and the interim brake 26 of the primary transmission 20, respectively. Some of these regulating valves 76-79, i.e. the regulating valves 77-79 for the coast brake 27, the low reverse brake 29 and the interim brake 26, are applied at their control ports 77a, 78a and 79a, respectively, with control pressure, regulated by a first linear solenoid valve 81, through a pressure line 82. On the other hand, the regulating valve 76 for the direct connect clutch 23 is supplied at its control port 76a with, as a control pressure, the coupling pressure which is supplied to the direct connect clutch 23, through a pressure line 83.

The first linear solenoid valve 81 regulates the principal control pressure supplied through the pressure lines 47 and 84 from the first reducing valve 44 in accordance with a control signal received from the a controller (see FIG. 3) to generate control pressure according to the gears and driving conditions. The regulating valve 76 for the direct coupling clutch 23 is communicated at its port 76b with an anti-regulation pressure line 86 through a pressure line 85 branching off from the reverse pressure line 53. Similarly, the regulating valve 78 for the low reverse brake 29 is communicated at its port 78b with an anti-regulation pressure line 87 through the pressure line 85. These anti-regulation pressure lines 86 and 87 function to prohibit the pressure regulating operation of the regulating valves 76 and 78, respectively. In the reverse (R) range, the line pressure is supplied to the regulating valve 76 and 78 at their ports 76b and 78b to shift their spools to the left as viewed in FIG. 2 and retain them there, thereby preventing the regulating valve 76 and 78 from regulating and reducing the line pressure. Similarly, when the coasting brake 27 is supplied at its port 79b with a coupling pressure, the regulating valve 79 is supplied at its port 79b with the coupling pressure through a pressure line 88 so as to be prevented from governing the operation of pressure regulation.

The control pressure developed by means of the first linear solenoid valve 81 is also supplied to a back pressure modulating valve 89 at its control port 89a. The back pressure modulating valve 89 regulates the line pressure, supplied from the main pressure line 42 through a pressure line 90, in accordance with the control pressure from the first linear solenoid valve 81, thereby producing back pressure supplied to second and third accumulators 91 and 92 at their back pressure ports 91a and 92a through pressure lines 93 and 94, respectively.

For controlling the operation of the secondary transmission 30, the hydraulic control circuit includes a second linear solenoid valve 95 to regulate coupling pressure which is supplied to the direct coupling clutch 32 and the speed reducing brake 34. The second linear solenoid valve 95 receives, as a principal control pressure, the line pressure from the main pressure line 42 through a pressure line 96 and regulates the line pressure in accordance with a control signal from the controller so as to generate a control pressure for the direct coupling clutch 32 and the speed reducing brake 34.

The following description will be directed to how coupling pressure is supplied by the hydraulic control circuit 40 to the respective clutches and brakes for each of the gears.

Initially, for the first gear, rendering engine brake be non-functional, in the drive (D) range, with respect to the primary transmission 20, the first to third ON-OFF solenoid valves 71-73 are energized or turned on, deenergized or turned off, and deenergized or turned off, respectively, and the spools of the first to third shift valves 61-63 are positioned on the left, the right, and the right, respectively, as viewed in FIG. 2. In this condition, a pressure line 101, branching off from the forward pressure line 52, communicates with a pressure line 102 through the first shift valve 61, and also communicates with a pressure line 103 through the second shift valve 62. However, the pressure line 103 is isolated by the third shift valve 63. Likewise, a pressure line 104, also branching off from the forward pressure line 52, is isolated by the second shift valve 62, and a pressure line 105, branching off from the main pressure line 42, is isolated by the first shift valve 61. Accordingly, in this condition, only the forward propulsion clutch 24, which is coupled at all times in all of the forward gears, remains coupled, and the primary transmission 20 provides the first gear which renders engine brake unavailable. On the other hand, with regard to the secondary transmission 30, the fourth and fifth ON-OFF solenoid valves 74 and 75 are deenergized or turned off, and the spools of the fourth and fifth shift valves 64 and 65 are both positioned on the right side as viewed in FIG. 2. Accordingly, a pressure line 106, branching off from the main pressure line 42, communicates with a pressure line 107 through the fourth shift valve 64, and communicates with a pressure line 108, in communication with the speed reducing brake 34, through the fifth shift valve 65, so as to supply the line pressure to the speed reducing brake 34. As a result, the speed reducing brake 34 is coupled so as to shift the secondary transmission 30 to a reducing gear. Then the automatic transmission 1 provides the first gear which renders engine brake unavailable.

For the first gear, rendering engine brake available, in the first and second ranges, only the third solenoid valve 73 is energized or turned on from the condition for the first gear rendering engine brake unavailable, and hence only the spool of the third shift valve 63 is changed in position to the left as viewed in FIG. 2. Accordingly, in this instance, the forward pressure line 52 communicates with a pressure line 109 leading to the low reverse brake controller valve 78. Communication is established through the branch pressure line 101, the first shift valve 61, the pressure line 102, the second shift valve 62, the pressure line 103 and the third shift valve 63, so as to supply the line pressure to the control valve 78. The line pressure thus supplied to the control valve 78 is regulated to a coupling pressure corresponding to the control pressure supplied through the first linear solenoid valve 81 and then is supplied to the low reverse brake 29. As a result, the low reverse brake 29 is coupled as well as the forward propulsion clutch 24, so as to provide the first gear, rendering engine brake available, of the primary transmission 20. However, since the secondary transmission 30 remains in the speed reducing gear, the automatic transmission 1 is shifted to the first gear rendering engine brake available.

For the second gear, rendering engine brake be non-functional, in the drive (D) range, and for the first gear, rendering engine brake be non-functional, in the first (1st) range and second (2nd) range, only the secondary transmission 30 changes its gear from the condition created for the first gear rendering engine brake available and the first gear rendering engine brake unavailable. In other words, the fifth ON-OFF solenoid valve 75 of the secondary transmission 30 is energized or turned on, and the spool of the fifth shift valve 65 is changed in position to the left as viewed in FIG. 2. Consequently, the pressure line 107 leading to the fifth shift valve 65 from the fourth shift valve 64 communicates with a pressure line 110 leading to the direct coupling clutch 32, so as to couple the direct coupling clutch 32. Then, the secondary transmission 30 provides a directly coupled gear, and, hence, the automatic transmission 1 is shifted to the second gear rendering engine brake available or the second gear rendering engine brake unavailable. Since when the secondary transmission 30 changes from the speed reducing gear to the directly coupled gear, the fourth ON-OFF solenoid valve 74 is inactivated or turned off after it has been energized or turned on, the spool of the fourth shift valve 64 is temporarily positioned on the left to isolate the pressure lines 106 and 107. During this period, the second linear solenoid valve 95 adjusts a coupling pressure and directs it to the direct coupling clutch 32 through the pressure line 97 and the fifth shift valve 65.

For the third gear, in the primary transmission 20, the first to third ON-OFF solenoid valves 71–73 are, respectively, turned off, on and on, and the spools of the first to third shift valves 61–63 are forced to the right, the left and the left, respectively, as viewed in FIG. 2. In this instance, the branch pressure line 101, extending from the forward pressure line 52, communicates with a pressure line 111 through a first shift valve 61, and further communicates with a pressure line 112, leading to the coast brake control valve 77, through the third shift valve 63. As a result, the line pressure is supplied to the regulating valve 77 and, after being regulated by the regulating valve 77, supplied to the coast brake 27. This results in coupling the coast brake 27. In addition, another branch pressure line 104, extending from the forward pressure line 52, communicates with a pressure line 113 leading to the interim brake control valve 79 through the second shift valve 62 and sends the line pressure to the regulating valve 79. In this instance, the regulating valve 79 receives the control pressure from the first linear solenoid valve 81 and is supplied concurrently with the coupling pressure, being supplied to the coast brake 27, through the pressure line 88. A coupling pressure, regulated in accordance with the control pressure and coupling pressure, is supplied to the interim brake 26. As a result, in the primary transmission 20, the interim brake 26 is coupled as well as the forward propulsion clutch 24, and further, the coast brake 27 is coupled, the second gear, rendering engine brake available, is provided. In this instance, on the other hand, in the secondary transmission 30, the fourth and fifth ON-OFF solenoid valves 74 and 75 are both deenergized or turned off, then the speed reducing gear is provided in the same manner as previously described for the first gear. Consequently, the automatic transmission 1 is shifted to the third gear which offers a specific speed reduction ratio, and renders engine brake available.

For the fourth gear, in the primary transmission 20, the first to third ON-OFF solenoid valves 71–73 are deenergized or turned off, energized or turned on, and deenergized or turned off, respectively, whereas the spools of the first to third shift valves 61–63 change in position to the right, the left, and the right, respectively, as viewed in FIG. 2. Accordingly, the pressure line 105, branching off from the main pressure line 42, communicates with a pressure line 114 through the first shift valve 61, and, at the same time, communicating with a pressure line 115 leading to the direct coupling clutch control valve 76 through the third shift valve 63. Then, the line pressure is supplied to and regulated as a coupling pressure by the regulating valve 76. The regulated coupling pressure is supplied to the direct coupling clutch 23 through a pressure line 116, so as to couple the direct coupling clutch 23. By this means, the primary transmission 20 is shifted to the third gear as a result of coupling of both forward propulsion clutch 24 and direct coupling clutch 23. In this instance, when the direct coupling clutch 23 is coupled, the coupling pressure is gradually supplied under the operation of the second accumulator 91. On the other hand, in the secondary transmission 30, as was previously described for the third gear, the fourth and fifth ON-OFF solenoid valves 74 and 75 are both deenergized or turned off, and the speed reduction gear has been created, as a result of which the automatic transmission 1 achieves the fourth gear.

When, from the state of the fourth gear of the secondary transmission 30, the fifth ON-OFF solenoid valve 75 is deenergized or turned off, and thereby, the fifth shift valve 65 forces the spool to the left, the direct coupling clutch 32 in the secondary transmission 30 is coupled, so as to provide the directly coupled gear. As a result, the automatic transmission 1 effectively undergoes the fifth gear. In this instance, when changing to the directly coupled gear, the fourth ON-OFF solenoid valve 74 of the secondary transmission 30 is once energized or turned on and then, deenergized or turned off, so as to temporarily supply a coupling pressure, regulated by the second linear solenoid valve 95, to the direct coupling clutch 32.

When the manual valve 43 is operated so as to shift the automatic transmission 1 to the reverse (R) gear, it communicates the reverse pressure line 53 with the main pressure line 42. Concurrently, the first to third ON-OFF solenoid valves 71–73 are deenergized or turned off, and the first to third shift valves 61–63 force their spools to the right as viewed in FIG. 2. Consequently, the pressure line 105, branching off from the main pressure line 42, communicates with a pressure line 114 through the first shift valve 61, and also communicating with the pressure line 115, leading to the regulating valve 76, through the third shift valve 63, as was described for the fourth and fifth gear. Then the line pressure is supplied to the regulating valve 76. In this instance, the regulating valve 76 is supplied at its one port 76b with the line pressure from the reverse pressure line 53 through the pressure lines 85 and 86, and accordingly, the regulating valve 76 holds its spool unchanged in position on the left as viewed in FIG. 2. Hence, the line pressure supplied from the pressure line 115 is directed to the direct coupling clutch 24 through the pressure line 116 without being reduced, and couples the direct coupling clutch 24 with a high coupling pressure. Further, the reverse pressure line 53 communicates with the regulating valve 78 through the pressure line 118 provided with the orifice 117 which differs the amount of working oil passing therethrough between being supplied and discharged, the third shift valve 63 and the pressure line 109, and then, the line pressure is supplied to the regulating valve 78 in the same manner as described in connection with the engine brake available first gear. In this instance, to the port 78b of the regulating valve 78, the line pressure is introduced through the pressure lines 85 and 87 branching off from the reverse pressure line 53. By this means, the regulating valve 78 holds its spool unchanged in position on the left as viewed in FIG. 2. Because of this, the line pressure supplied through the pressure line 109 is directly supplied to the low reverse brake 29 without being regulated by the regulating valve 78, so as to couple the low reverse brake 29 with a high coupling pressure. As a result, the primary transmission 20 causes the direct coupling clutch 24 and the low reverse brake 29 to be coupled so as to achieve the reverse gear. On the other hand, the secondary transmission 30 keeps the fourth and fifth ON-OFF solenoid valves 74 and 75 deenergized or turned off, and accordingly maintains the speed reducing gear. It is understood that when the coupling pressure is supplied to the low reverse brake 29, the working oil is introduced into the third accumulator 92 from the pressure line 118 through a pressure line 119, so that the coupling pressure gradually rises.

The hydraulic control circuit 40 further includes first and second shift valves 121 and 122, for governing locking and unlocking of the lockup clutch 17 within the torque converter 10, and a lockup control valve 123. A converter pressure line 124 is led to the first shift valve 121 and lockup control valve 123 from the main pressure line 42. Further, the first shift valve 121 is connected at its end port 121 to the control pressure line 66, extending from the second reducing valve 45, through a pressure line 125. The pressure line 125 is provided with a lockup control ON-OFF solenoid valve 126. When the ON-OFF solenoid valve 126 is deenergized or turned off, a control pressure is introduced to the first shift valve 121 at the end port 121, and as a result of this, the shift valve 121 forces its spool to the right as viewed in FIG. 2. During this operation, the converter pressure line 124 communicates with a release pressure line 127 leading to an unlock or release chamber (UNLC) 17a within the torque converter 10, so as to supply a pressure into the unlock or release chamber 17a to release or unlock the torque converter 10.

On the other hand, when the ON-OFF solenoid valve 126 is deenergized or turned off, and consequently, the control pressure from the first shift valve 121 is drained, the first shift valve 121 forces the spool to the right as viewed in FIG. 2. As a result, the converter pressure line 124 communicates with the coupling pressure line 128 leading to a lockup or coupling chamber (LC) 17b within the torque converter 10, so as to couple the lockup clutch 17. During this operation, the release pressure line 127 communicates with the lockup control valve 123 through the first shift valve 121 and the pressure line 129 so as to supply an unlock or release pressure, regulated by the lockup control valve 123, to the unlock or release chamber 17a of the lockup clutch 17. Specifically, the lockup control valve 123 is connected at its one port 123a to the control pressure line 130 leading from the first reducing valve 44, and the control pressure line 130 is provided with a duty solenoid valve 131. By adjusting a control pressure at to the port 123a of the lockup control valve 123 in accordance with the duty ratio of the duty solenoid valve 131, the release pressure is regulated. The control pressure, regulated by means of the duty solenoid valve 131, is supplied also to the secondary shift valve 122 at its port 122a through a pressure line 132. If the control pressure is below a specified level, the spool of the secondary shift valve 122 is positioned on the right, so that the pressure line 133, leading from the main pressure line 42 via the pressure line 56, communicates with the lockup control valve 123 at its ports 123b through a pressure line 134, supplying the line pressure to the lockup control valve 123. Thus, the regulating action of release pressure of the lockup control valve 123 is prevented, and, at this time, the lockup clutch 17 is applied with only a coupling pressure and is coupled completely. On the other hand, if the control pressure exceeds the specified level, the lockup control valve 123 regulates the release pressure, and in accordance with the regulated release pressure, the lockup clutch 17 is slip-controlled. In this instance, when there is no introduction of control pressure into the second shift valve 122, its spool is positioned on the right so as to communicate a pressure line 135, which bypasses the orifice 54 disposed in the pressure line 52 leading to the forward propulsion clutch 24, with the forward propulsion clutch 24.

Figure 3:
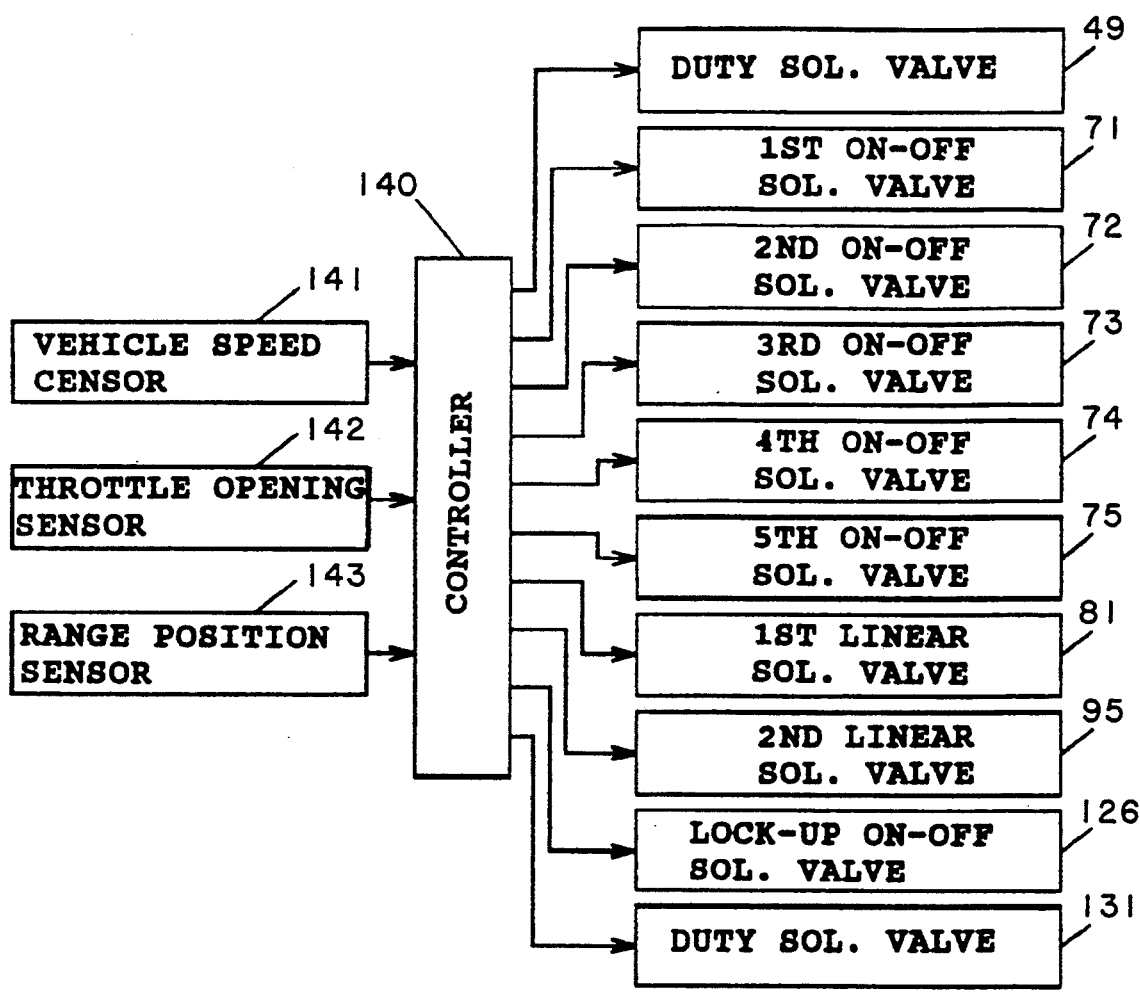
FIG. 3 is a block diagram of a control system for solenoid valves of the hydraulic control circuit shown in FIG. 2.

The various solenoid valves included the hydraulic circuit 40, such as the line pressure regulating duty solenoid valve 49, the first to fifth gear shifting ON-OFF solenoid valves 71-75, the first and second coupling pressure regulating linear solenoid valves 81 and 95, the lockup control ON-OFF solenoid valve 126 and the duty solenoid valve 131, are controlled according to control signals from a controller 140 as shown in FIG. 3. For solenoid valve control, the controller 140 receives signals, such as a vehicle speed signal from a vehicle speed sensor 141, a throttle opening signal from a throttle opening sensor 142 and a selected range signal from a range position sensor 143, all of which sensors are well known in structure and operation to those skilled in the art. The controller 140 selectively energizes and deenergizes the solenoid valves based on the signals representative of driving conditions and driver's demands.

As apparent from the above description, the hydraulic control circuit 40 utilizes a single linear solenoid valve both to regulate coupling pressure of the regulating valves and to control back pressure of the accumulators.

Figure 4:
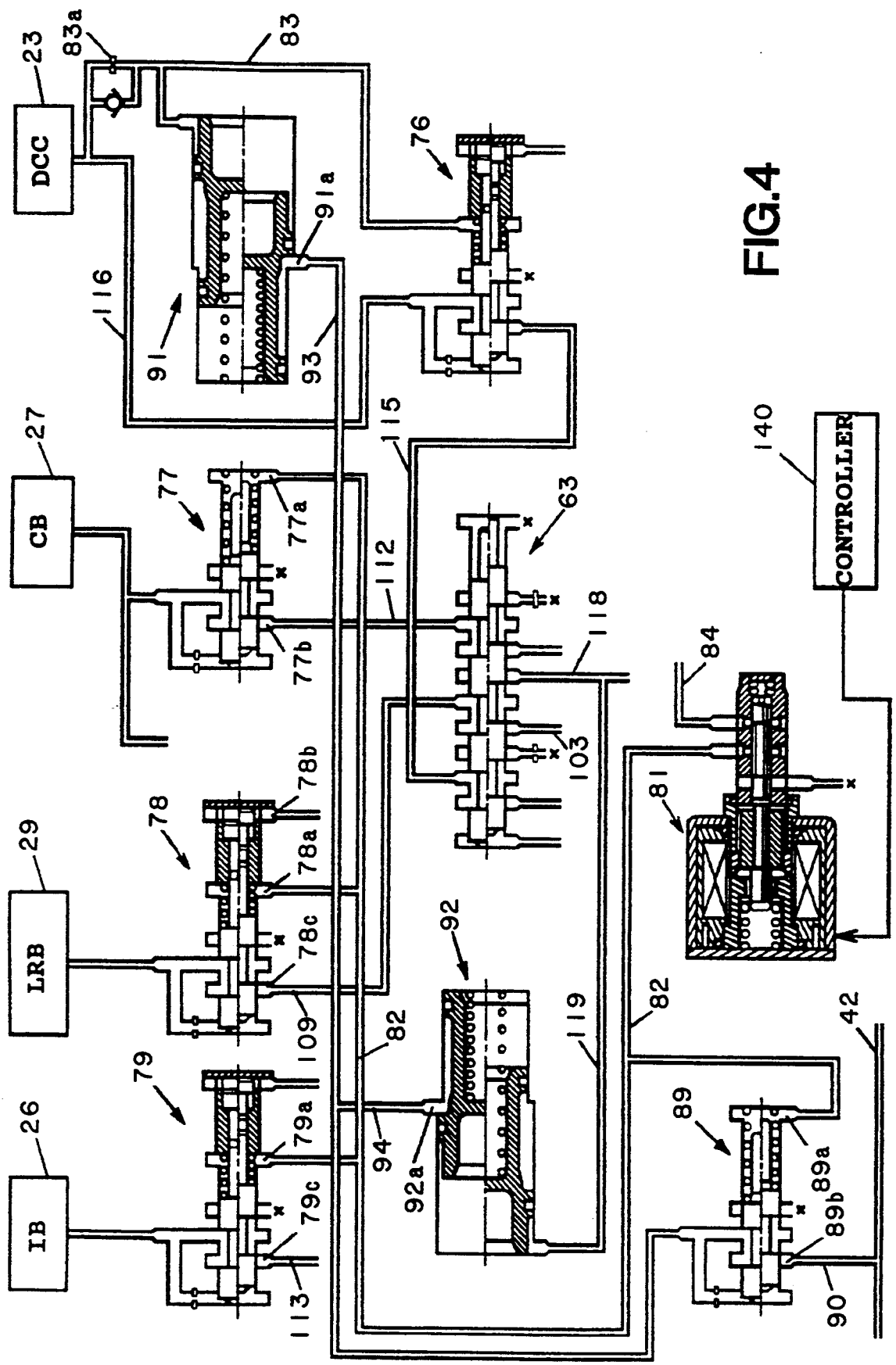
FIG. 4 is an enlarged schematic diagram of the essential part of the hydraulic control circuit shown in FIG. 2.

Referring to FIG. 4, the first linear solenoid valve 81 regulates the line pressure from the pressure line 84, as a source pressure, to a control pressure specified in level in accordance with a control signal from the controller 140. The control pressure thus regulated is delivered to each of the control ports 77a, 78a and 79a of the coast brake pressure regulating valve 77, the low reverse brake pressure regulating valve 78, and the interim brake pressure regulating valve 79, respectively, through the pressure line 82. On the other hand, the coast brake pressure regulating valve 77 is supplied at its input port 77b with the line pressure via the third shift valve 63 through the pressure line 112 when the automatic transmission 1 is in the third gear. The low reverse brake pressure regulating valve 78 is supplied at its input port 78c with the line pressure from the third shift valve 63 through the pressure line 109 when the automatic transmission 1 is in the engine brake available first gear. The interim brake pressure regulating valve 79 is applied at its intake port 79c with the line pressure from the second shift valve 62 (see FIG. 2) through the pressure line 113. The line pressures are regulated by each of the regulating valves 77-79 to a specific level of coupling pressure corresponding to the control pressure of the first linear solenoid valve 81 and then is supplied to the coast brake 27, the low reverse brake 29 or the interim brake 26 according to selected gears of the automatic transmission 1. In this instance, the control pressure is regulated to the most appropriate level for each of the gears in which the regulating valves 77-79 operate. By this control pressure regulation, the coupling pressure, or in other words, the transmissive torque, of the coast brake 27, the low reverse brake 29 or the interim brake 26, is adjusted so as to meet the input torque thereof. Because of this, these brakes 26, 27 and 29 can accurately transmit their input torque while avoiding an increase in shock caused by an excessive coupling pressure and/or an excessive operational loss of the oil pump 4.

On the other hand, the control pressure developed by the first linear solenoid valve 81 is also supplied to the back pressure modulating valve 89 at its control port 89a. The back pressure modulating valve 89 regulates at its input port 89b the line pressure, supplied from the main pressure line 42 through the pressure line 90, to a specified level of accumulator back pressure in accordance with the control pressure. The accumulator back pressure is supplied to the second and third accumulators 91 and 92 at their back pressure ports 91a and 92a through the pressure lines 93 and 94, respectively. When, during shifting from the third gear to the fourth, the coupling pressure is supplied to the direct coupling clutch 23 from the third shift valve 63 through the pressure line 115 and the pressure line 116 via the regulating valve 76, the working oil is introduced into the second accumulator 91 through the pressure line 116 via the orifice 83a. On the other hand, during shifting to the reverse gear, the working oil is introduced into the third accumulator 92 through the pressure line 119 from the pressure line 118 which is the coupling pressure line for the low reverse brake 29. Because of this, during this shifting, what is called a "rack pressure" of the coupling pressure is developed, shift shock is decreased. The "rack pressure" is defined as a pressure that is temporarily maintained for a while at an in-between level during the rising of pressure or the falling of pressure. In this instance, since the accumulators 91 and 92 are supplied at their back pressure ports 91a and 92a with the back pressure regulated by the back pressure modulating valve 89 in accordance with the control pressure developed by the first linear solenoid valve 81, by controlling the first linear solenoid valve 81 to develop a proper control pressure according to a control signal from the controller 140, the rack pressure can be controlled suitably for each gear shift. This results in effectively reducing shift shock.

According particularly to the construction of the automatic transmission control system described above, on one hand, a control pressure developed by the first linear solenoid valve 81 is directly supplied to the respective regulating valves 77–79, and, on the other hand, the control pressure developed by the first linear solenoid valve 81 is indirectly, via the back pressure modulating valve 89, supplied as a back pressure to the respective accumulators 91 and 92. Accordingly, each of the control valves 77–79 is enabled to regulate or adjust the coupling pressure with a high accuracy, while a sufficient quantity of the working oil is guaranteed for providing a back pressure of each of the accumulators 91 and 92. In addition, since the regulating valves 77–79 and the accumulators 91 and 92 operate at different timings, the control pressure developed by the first linear solenoid valve 81 is adjusted to a required level at each specific timing.

When shifting into the reverse gear, despite the low reverse brake pressure regulating valve 78 and the third accumulator 92 coincidentally operating, the regulating valve 78 is prevented in its pressure regulating operation by the line pressure at its control port 78b, so that the first linear solenoid valve 81 is required only to produce the control pressure to be supplied to the back pressure modulating valve 89 so as to properly control the accumulator 92. In this manner, the control valves and the accumulators, which function differently, can be controlled appropriately, even in multiple numbers, by the single linear solenoid valve 81.

It is also to be understood that although the present invention has been described in detail with respect to a preferred embodiment thereof, various other embodiments and variants may occur to those skilled in the art. Such other embodiments and variants fall within the scope and spirit of the invention and are intended to be covered by the following claims.

What is claimed is:

1. A control system for controlling an automatic transmission of a vehicle, which includes a hydraulic control circuit for controlling coupling pressure supplied to a plurality of frictional coupling elements of the automatic transmission which are (1) selectively coupled and uncoupled so as to shift the automatic transmission into desired gears and (2) divided into a first group of frictional coupling elements having a coupling pressure controlled in accordance with a control pressure and a second group of frictional coupling elements having a coupling pressure independent from said control pressure, said hydraulic control circuit comprising:

driving condition detecting means for detecting driving conditions of the vehicle;

an oil pump for generating a hydraulic pressure;

solenoid valve means for regulating said hydraulic pressure so as to provide said control pressure in accordance with vehicle driving conditions detected by said driving condition detecting means;

regulating valve means, provided for each frictional coupling element in said first group, for regulating a coupling pressure supplied to each frictional coupling element in said first group in accordance with said control pressure;

accumulating means for controlling a supply of said coupling pressure of specified frictional coupling elements of said second group of frictional coupling elements during shifting of said automatic transmission; and control valve means for controlling a back pressure supplied to said accumulating means in accordance with said control pressure.

2. A control system as defined in claim 1, wherein said accumulating means comprises at least two accumulators.

3. A control system as defined in claim 2, wherein said solenoid valve means is coupled to more than two regulating valves of said regulating valve means and at least two accumulators of said accumulating means.

4. A control system as defined in claim 1, and further comprising another valve means for regulating said hydraulic pressure supplied to said frictional coupling elements of said second group.

5. A control system for an automatic transmission of a vehicle, which includes a hydraulic control circuit for controlling coupling pressure supplied to a plurality of frictional coupling elements of the automatic transmission which are selectively coupled and uncoupled so as to shift the automatic transmission into desired gears, said hydraulic control circuit comprising:

driving condition detecting means for detecting driving conditions of the vehicle;

an oil pump for generating a hydraulic pressure;

solenoid valve means for regulating said hydraulic pressure so as to provide a control pressure in accordance with vehicle driving conditions detected by said driving condition detecting means;

regulating valve means, provided for each of said frictional coupling elements, for regulating a coupling pressure supplied to each of said frictional coupling elements in accordance with said control pressure;

accumulating means for controlling a supply of said coupling pressure to said frictional coupling elements during shifting of said automatic transmission;

control valve means for controlling a back pressure supplied to said accumulating means in accordance with said control pressure; and interrupting means for interrupting pressure regulation of said regulating valve means for at least one of said frictional coupling elements operatively connected to an accumulator of said accumulating means having a back pressure which is controlled by said control valve means.

6. A control system as defined in claim 5, and further comprising another solenoid valve means for regulating said hydraulic pressure supplied as a control pressure to said interrupting means.

* * * * *